(12) United States Patent
Shao

(10) Patent No.: US 10,123,104 B1
(45) Date of Patent: Nov. 6, 2018

(54) MOBILE DEVICE AND WIRELESS EARPHONE

(71) Applicant: Wistron Corporation, New Taipei (TW)

(72) Inventor: Xiaoling Shao, New Taipei (TW)

(73) Assignee: Wistron Corporation, New Taipei (TW)

(*) Notice: Subject to any disclaimer, the term of this patent is extended or adjusted under 35 U.S.C. 154(b) by 0 days.

(21) Appl. No.: 15/853,980

(22) Filed: Dec. 26, 2017

(30) Foreign Application Priority Data

Nov. 17, 2017 (CN) .................... 2017 2 1546494 U

(51) Int. Cl.
*H04R 1/10* (2006.01)
*H04M 1/03* (2006.01)

(52) U.S. Cl.
CPC .......... *H04R 1/1016* (2013.01); *H04M 1/035* (2013.01); *H04R 2400/01* (2013.01); *H04R 2420/07* (2013.01); *H04R 2420/09* (2013.01); *H04R 2499/11* (2013.01)

(58) Field of Classification Search
CPC .. H04M 1/0258; H04M 1/035; H04R 1/1016; H04R 2400/01; H04R 2420/07; H04R 2420/09; H04R 2499/11
See application file for complete search history.

(56) References Cited

U.S. PATENT DOCUMENTS

| 7,574,239 B2* | 8/2009 | Bjerrum-Niese ........................... B60R 11/0247 455/569.1 |
| 2004/0063456 A1* | 4/2004 | Griffin ................. H04B 1/3877 455/550.1 |
| 2005/0089186 A1* | 4/2005 | Kulas .................. H04M 1/0258 381/384 |
| 2005/0130593 A1* | 6/2005 | Michalak ............... G08B 21/24 455/66.1 |

(Continued)

FOREIGN PATENT DOCUMENTS

| CN | 201114038 | 9/2008 |
| CN | 202309816 | 7/2012 |

(Continued)

*Primary Examiner* — Davetta W Goins
*Assistant Examiner* — Kuassi Ganmavo
(74) *Attorney, Agent, or Firm* — Winston Hsu

(57) ABSTRACT

A mobile device includes a device body and a wireless earphone. A back of the device body has an accommodating recess. The device body includes a first processing unit, a first wireless communication unit and a first electrical connector. The first electrical connector is disposed in the accommodating recess. The wireless earphone includes a second processing unit, a second wireless communication unit and a second electrical connector. The wireless earphone is configured to be detachably accommodated in the accommodating recess of the device body. When the wireless earphone is detached from the accommodating recess, the first electrical connector and the second electrical connector are separated from each other, the first processing unit (Continued)

switches on the first wireless communication unit, and the second processing unit switches on the second wireless communication unit, such that the first wireless communication unit and the second wireless communication unit are paired with each other.

8 Claims, 4 Drawing Sheets

(56) References Cited

U.S. PATENT DOCUMENTS

| | | | | |
|---|---|---|---|---|
| 2006/0019718 A1* | 1/2006 | Kuo | ............... | H04M 1/05 |
| | | | | 455/569.1 |
| 2009/0054051 A1* | 2/2009 | Cavallo | ............... | H04M 1/0258 |
| | | | | 455/420 |
| 2009/0108801 A1* | 4/2009 | Kozisek | ............... | H04M 1/0258 |
| | | | | 320/103 |
| 2012/0185629 A1* | 7/2012 | Kan | ............... | H04M 1/0258 |
| | | | | 710/300 |
| 2013/0094687 A1* | 4/2013 | Weinstein | ............... | H04R 1/10 |
| | | | | 381/334 |
| 2015/0326990 A1* | 11/2015 | Yeh | ............... | H04R 1/1041 |
| | | | | 381/311 |

FOREIGN PATENT DOCUMENTS

| | | | | |
|---|---|---|---|---|
| CN | 104333630 | | 2/2015 | |
| EP | 1536615 A1 * | 6/2005 | ......... | H04M 1/0258 |

* cited by examiner

MOBILE DEVICE AND WIRELESS EARPHONE

BACKGROUND OF THE INVENTION

1. Field of the Invention

The invention relates to a mobile device and a wireless earphone and, more particularly, to a mobile device equipped with a detachable wireless earphone.

2. Description of the Prior Art

As technology advances and develops, various mobile devices (e.g. mobile phone, personal digital assistant, tablet computer, and so on) are considered a necessity by a lot of people in their daily lives. Furthermore, the mobile device may be used with a wireless earphone, such that the operation of the mobile device gets more convenient. However, since the mobile device and the wireless earphone both are independent individuals, the wireless earphone may be lost easily and a user may forget to carry the wireless earphone with him/her. Still further, when the user needs to use the wireless earphone temporarily, the user has to take out the wireless earphone from a backpack or other containers and that is a little inconvenient. Moreover, the wireless earphone works through an individual power source. When the power of the wireless earphone is insufficient and the wireless earphone cannot be charged in time, the user may be upset.

SUMMARY OF THE INVENTION

The invention provides a mobile device equipped with a detachable wireless earphone, so as to solve the aforesaid problems.

According to an embodiment of the invention, a mobile device includes a device body and a wireless earphone. A back of the device body has an accommodating recess. The device body includes a first processing unit, a first wireless communication unit and a first electrical connector, wherein the first processing unit is electrically connected to the first wireless communication unit and the first electrical connector. The first electrical connector is disposed in the accommodating recess. The wireless earphone includes a second processing unit, a second wireless communication unit and a second electrical connector, wherein the second processing unit is electrically connected to the second wireless communication unit and the second electrical connector. When the wireless earphone is accommodated in the accommodating recess, the first electrical connector and the second electrical connector are electrically connected to each other, the first processing unit switches off the first wireless communication unit, and the second processing unit switches off the second wireless communication unit. When the wireless earphone is detached from the accommodating recess, the first electrical connector and the second electrical connector are separated from each other, the first processing unit switches on the first wireless communication unit, and the second processing unit switches on the second wireless communication unit, such that the first wireless communication unit and the second wireless communication unit are paired with each other.

According to another embodiment of the invention, a wireless earphone is configured to be detachably accommodated in an accommodating recess of a back of a device body. The device body includes a first processing unit, a first wireless communication unit and a first electrical connector, wherein the first processing unit is electrically connected to the first wireless communication unit and the first electrical connector. The first electrical connector is disposed in the accommodating recess. The wireless earphone includes a second processing unit, a second wireless communication unit and a second electrical connector. The second processing unit is electrically connected to the second wireless communication unit and the second electrical connector. When the wireless earphone is accommodated in the accommodating recess, the first electrical connector and the second electrical connector are electrically connected to each other, the first processing unit switches off the first wireless communication unit, and the second processing unit switches off the second wireless communication unit. When the wireless earphone is detached from the accommodating recess, the first electrical connector and the second electrical connector are separated from each other, the first processing unit switches on the first wireless communication unit, and the second processing unit switches on the second wireless communication unit, such that the first wireless communication unit and the second wireless communication unit are paired with each other.

As mentioned in the above, a user may accommodate the wireless earphone in the accommodating recess of the device body, so as to store or carry the wireless earphone conveniently. When the user wants to use the wireless earphone, the user may detach the wireless earphone from the accommodating recess of the device body. At this time, the device body and the wireless earphone will switch on the wireless communication units, respectively, such that the wireless communication units are paired with each other. After the wireless communication units are paired with each other, the device body and wireless earphone can communicate with each other through the wireless communication units accordingly. When the user accommodates the wireless earphone in the accommodating recess of the device body again, the device body and the wireless earphone will switch off the wireless communication units, respectively. At this time, the speaker of the wireless earphone can be served as a receiver for the mobile device.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
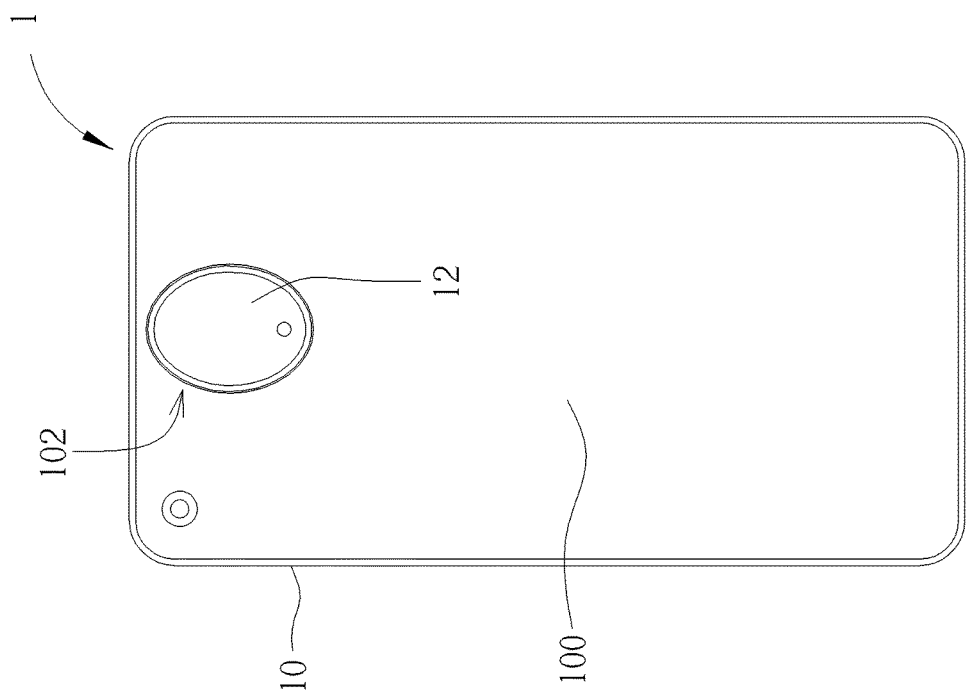
FIG. 2 is a rear view illustrating the mobile device shown in FIG. 1.
Figure 1:
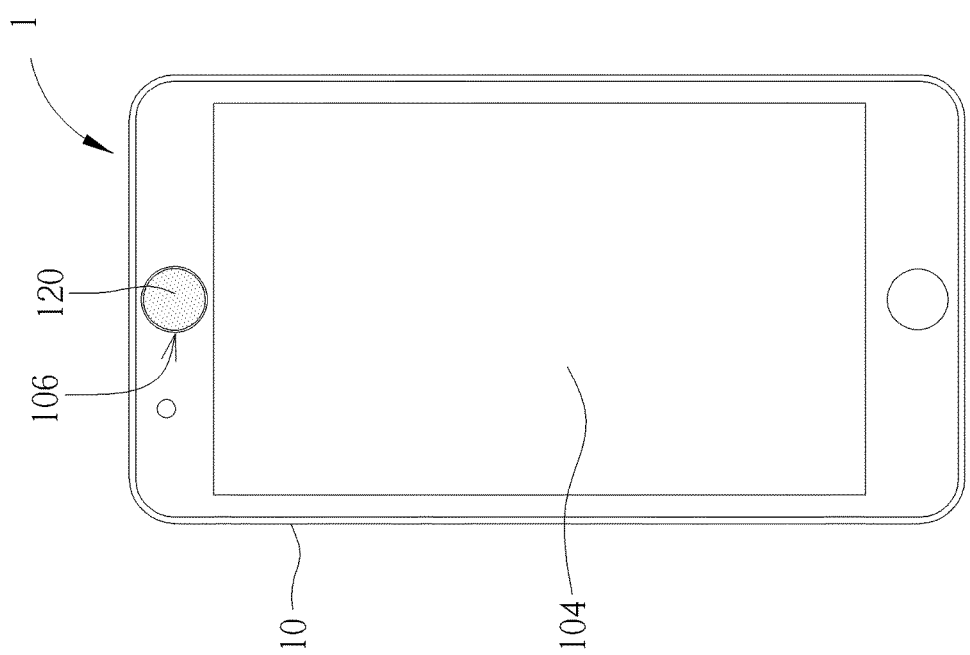
FIG. 1 is a front view illustrating a mobile device according to an embodiment of the invention.
Figure 3:
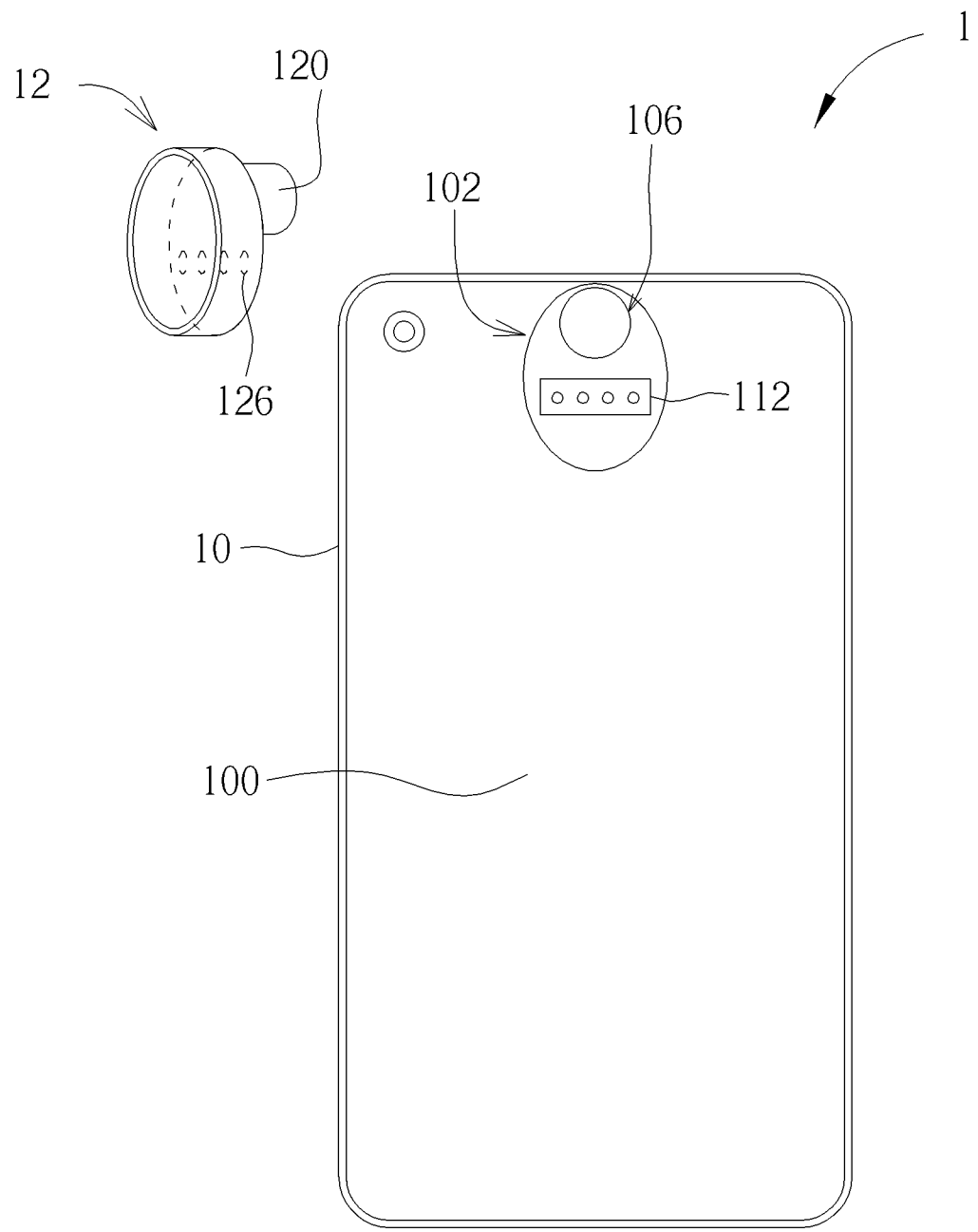
FIG. 3 is a schematic view illustrating the wireless earphone shown in FIG. 2 being detached from the accommodating recess.
Figure 4:
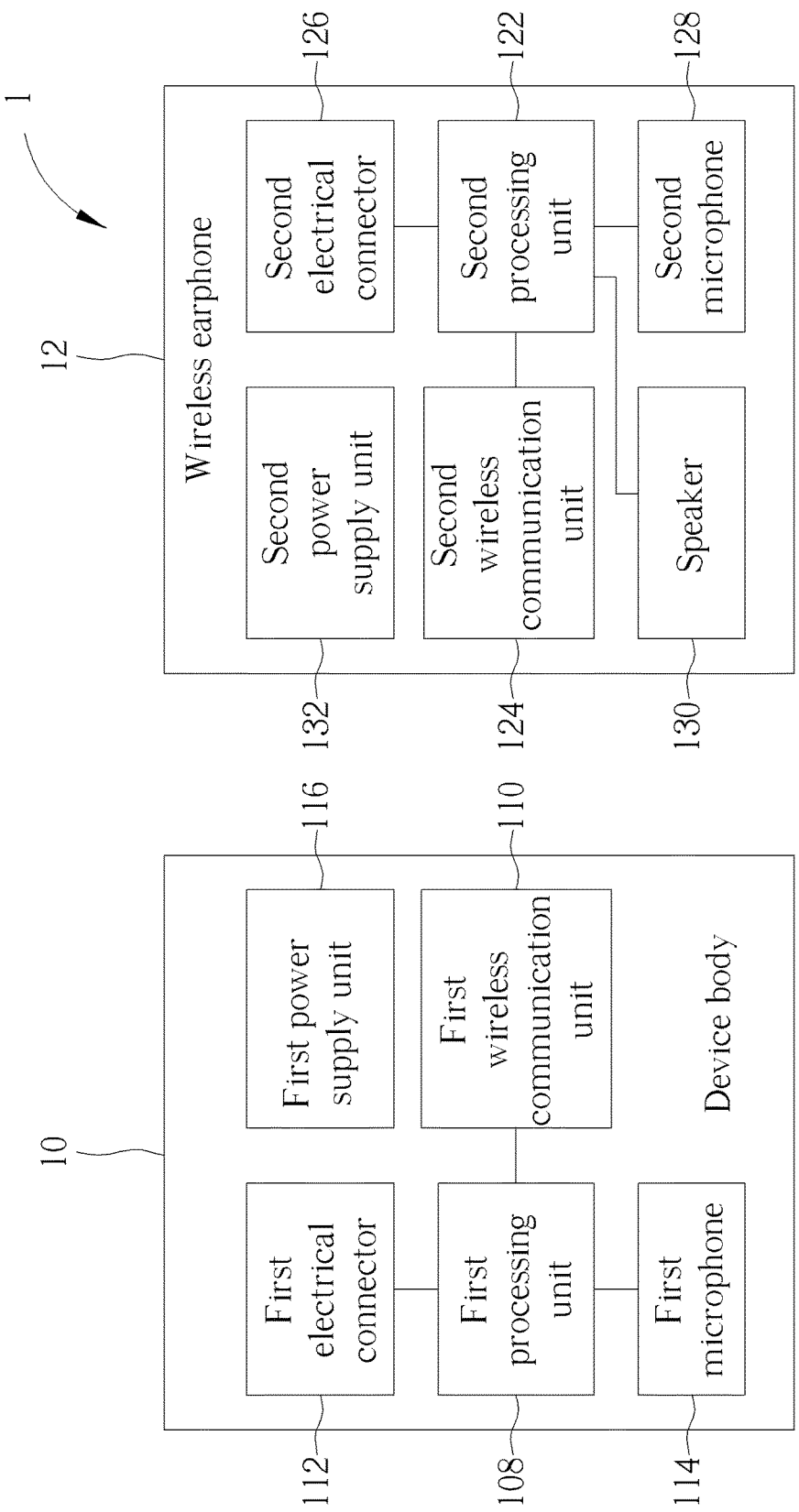
FIG. 4 is a functional block diagram illustrating the device body and the wireless earphone shown in FIG. 2.

Referring to FIGS. 1 to 4, FIG. 1 is a front view illustrating a mobile device 1 according to an embodiment of the invention, FIG. 2 is a rear view illustrating the mobile device 1 shown in FIG. 1, FIG. 3 is a schematic view illustrating the wireless earphone 12 shown in FIG. 2 being detached from the accommodating recess 102, and FIG. 4 is a functional block diagram illustrating the device body 10 and the wireless earphone 12 shown in FIG. 2.

As shown in FIGS. 1 to 4, the mobile device 1 includes a device body 10 and a wireless earphone 12. In this embodiment, the device body 10 may be a mobile phone, a personal digital assistant, a tablet computer or other electronic devices. A back 100 of the device body 10 has an accommodating recess 102 and a front 104 of the device body 10 has a through hole 106, wherein the through hole 106 communicates with the accommodating recess 102. The wireless earphone 12 is configured to be detachably accommodated in the accommodating recess 102 of the back 100 of the device body 10. In this embodiment, the wireless earphone 12 has a receiver portion 120. When the wireless earphone 12 is accommodated in the accommodating recess 102, the receiver portion 120 is accommodated in the through hole 106. Accordingly, a user may accommodate the wireless earphone 12 in the accommodating recess 102 of the device body 10, so as to store or carry the wireless earphone 12 conveniently. When the user needs to use the wireless earphone 12, the user may use a finger to press the receiver portion 120 within the through hole 106 from the front 104 of the device body 10, so as to push the wireless earphone 12 out of the accommodating recess 102 by a specific distance. Then, the user can detach the wireless earphone 12 from the back 100 of the device body 10.

In this embodiment, when the wireless earphone 12 is accommodated in the accommodating recess 102, a surface of the receiver portion 120 may be flush with the front 104 of the device body 10 and a surface of the wireless earphone 12 may be flush with the back 100 of the device body 10. In another embodiment, when the wireless earphone 12 is accommodated in the accommodating recess 102, the surface of the wireless earphone 12 may protrude from the back 100 of the device body 10 slightly. Furthermore, a shape of the accommodating recess 102 may match with a shape of the wireless earphone 12, such that the wireless earphone 12 may be accommodated in the accommodating recess 102 in a tight-fitting manner.

The device body 10 includes a first processing unit 108, a first wireless communication unit 110, a first electrical connector 112, a first microphone 114 and a first power supply unit 116, wherein the first processing unit 108 is electrically connected to the first wireless communication unit 110, the first electrical connector 112 and the first microphone 114, and the first power supply unit 116 is electrically connected to the first processing unit 108, the first wireless communication unit 110, the first electrical connector 112 and the first microphone 114. It should be noted that, in order to simplify the figure, the connecting lines between the first power supply unit 116 and other components are not illustrated in FIG. 4. The first power supply unit 116 is configured to supply power for the first processing unit 108, the first wireless communication unit 110, the first electrical connector 112 and the first microphone 114. Furthermore, the first electrical connector 112 is disposed in the accommodating recess 102.

The wireless earphone 12 includes a second processing unit 122, a second wireless communication unit 124, a second electrical connector 126, a second microphone 128, a speaker 130 and a second power supply unit 132, wherein the second processing unit 122 is electrically connected to the second wireless communication unit 124, the second electrical connector 126, the second microphone 128 and the speaker 130, and the second power supply unit 132 is electrically connected to the second processing unit 122, the second wireless communication unit 124, the second electrical connector 126, the second microphone 128 and the speaker 130. It should be noted that, in order to simplify the figure, the connecting lines between the second power supply unit 132 and other components are not illustrated in FIG. 4. The second power supply unit 132 is configured to supply power for the second processing unit 122, the second wireless communication unit 124, the second electrical connector 126, the second microphone 128 and the speaker 130.

In practical applications, the first processing unit 108 and the second processing unit 122 may be processors or controllers with signal processing function; the first wireless communication unit 110 and the second wireless communication unit 124 may be Bluetooth modules, Wi-Fi modules or other wireless communication modules; and the first power supply unit 116 and the second power supply unit 132 may be batteries. Furthermore, the first electrical connector 112 and the second electrical connector 126 may comprise a plurality of electrical pads including data, power, ground and so on. In general, the device body 10 and the wireless earphone 12 may be further equipped with some necessary hardware or software components for specific purposes, such as an application, a circuit board, a memory, a display device, an input/output port, etc., and it depends on practical applications. Moreover, a volume control button may be disposed at a side of the wireless earphone 12, the back of the wireless earphone 12 may be a main button, and an indication light may be disposed at the back of the wireless earphone 12.

When the user wants to use the wireless earphone 12, the user may detach the wireless earphone 12 from the accommodating recess 102 of the device body 10. When the wireless earphone 12 is detached from the accommodating recess 102, the first electrical connector 112 of the device body 10 and the second electrical connector 126 of the wireless earphone 12 are separated from each other. At this time, the first processing unit 108 of the device body 10 switches on the first wireless communication unit 110 and the second processing unit 122 of the wireless earphone 12 switches on the second wireless communication unit 124, such that the first wireless communication unit 110 and the second wireless communication unit 124 are paired with each other. After the first wireless communication unit 110 and the second wireless communication unit 124 are paired with each other, the device body 10 and wireless earphone 12 can communicate with each other through the first wireless communication unit 110 and the second wireless communication unit 124 accordingly. It should be noted that the manner for pairing the first wireless communication unit 110 and the second wireless communication unit 124 is well known by one skilled in the art, so it will not be depicted herein in detail.

When the first electrical connector 112 of the device body 10 and the second electrical connector 126 of the wireless earphone 12 are separated from each other, the first processing unit 108 of the device body 10 disables the first microphone 114 and the second processing unit 122 of the wireless earphone 12 enables the second microphone 128 and enables the speaker 130. Accordingly, the user can communicate with somebody by the second microphone 128 and the speaker 130 of the wireless earphone 12 without interference from the first microphone 114 of the device body 10.

After using the wireless earphone 12, the user may accommodate the wireless earphone 12 in the accommodating recess 102 of the device body 10. When the wireless earphone 12 is accommodated in the accommodating recess 102 of the device body 10, the first electrical connector 112 of the device body 10 and the second electrical connector 126 of the wireless earphone 12 are electrically connected to each other. At this time, the first processing unit 108 of the device body 10 switches off the first wireless communication unit 110 and the second processing unit 122 of the wireless earphone 12 switches off the second wireless communication unit 124.

When the first electrical connector 112 of the device body 10 and the second electrical connector 126 of the wireless earphone 12 are electrically connected to each other, the first processing unit 108 of the device body 10 enables the first microphone 114 and the second processing unit 122 of the wireless earphone 12 disables the second microphone 128 and enables the speaker 130. Accordingly, the user can communicate with somebody by the first microphone 114 of the device body 10 and the speaker 130 of the wireless earphone 12 without interference from the second microphone 128 of the wireless earphone 12. At this time, the speaker 130 of the wireless earphone 12 can be served as a receiver for the mobile device 1.

Still further, when the first electrical connector 112 of the device body 10 and the second electrical connector 126 of the wireless earphone 12 are electrically connected to each other, the first power supply unit 116 of the device body 10 may charge the second power supply unit 132 of the wireless earphone 12 through the first electrical connector 112 and the second electrical connector 126. Accordingly, the user may utilize the device body 10 to charge the wireless earphone 12 anytime and need not carry an additional power source with him/her.

In this embodiment, the first processing unit 108 of the device body 10 may detect the connecting state between the first electrical connector 112 and the second electrical connector 126 by a built-in program and the second processing unit 122 of the wireless earphone 12 may also detect the connecting state between the first electrical connector 112 and the second electrical connector 126 by a built-in program.

Figure 5:
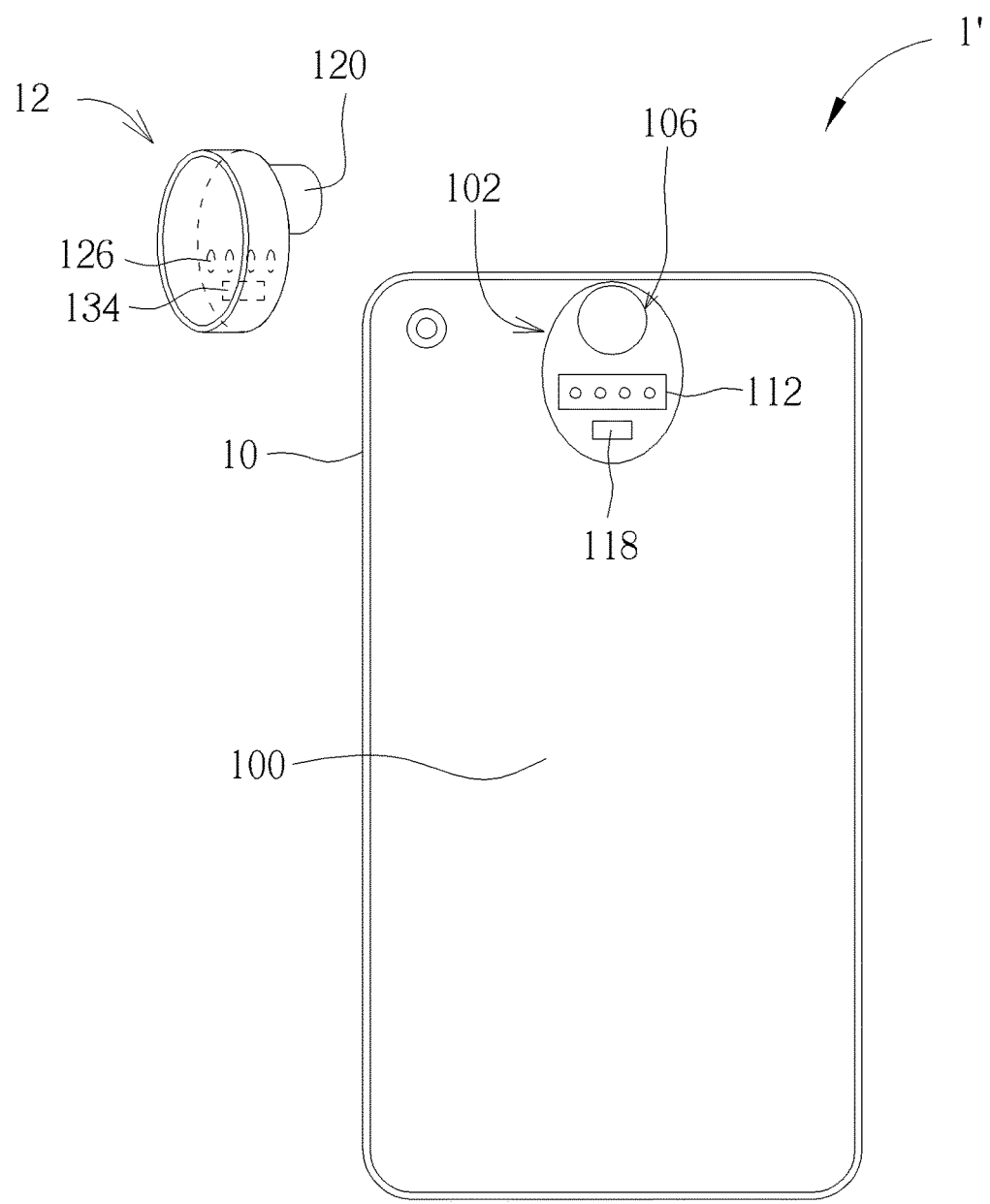
FIG. 5 is a rear view illustrating a mobile device according to another embodiment of the invention.

Referring to FIG. 5, FIG. 5 is a rear view illustrating a mobile device 1' according to another embodiment of the invention. As shown in FIG. 5, the main difference between the mobile device 1' and the aforesaid mobile device 1 is that the device body 10 of the mobile device 1' further includes a first magnetic member 118 and the wireless earphone 12 of the mobile device 1' further includes a second magnetic member 134, wherein the first magnetic member 118 is disposed in the accommodating recess 102 of the device body 10. Accordingly, when the wireless earphone 12 is accommodated in the accommodating recess 102 of the device body 10, the first magnetic member 118 and the second magnetic member 134 attract each other magnetically, such that the wireless earphone 12 can be accommodated in the accommodating recess 102 of the device body 10 stably.

As mentioned in the above, a user may accommodate the wireless earphone in the accommodating recess of the device body, so as to store or carry the wireless earphone conveniently. When the user wants to use the wireless earphone, the user may detach the wireless earphone from the accommodating recess of the device body. At this time, the device body and the wireless earphone will switch on the wireless communication units, respectively, such that the wireless communication units are paired with each other. After the wireless communication units are paired with each other, the device body and wireless earphone can communicate with each other through the wireless communication units accordingly. When the user accommodates the wireless earphone in the accommodating recess of the device body again, the device body and the wireless earphone will switch off the wireless communication units, respectively. At this time, the speaker of the wireless earphone can be served as a receiver for the mobile device. Furthermore, the user may utilize the device body to charge the wireless earphone anytime and need not carry an additional power source with him/her.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A mobile device, comprising:
a device body, a back of the device body having an accommodating recess, the device body comprising a first processing unit, a first wireless communication unit and a first electrical connector, the first processing unit being electrically connected to the first wireless communication unit and the first electrical connector, the first electrical connector being disposed in the accommodating recess; and
a wireless earphone comprising a second processing unit, a second wireless communication unit and a second electrical connector, the second processing unit being electrically connected to the second wireless communication unit and the second electrical connector;
wherein when the wireless earphone is accommodated in the accommodating recess, the first electrical connector and the second electrical connector are electrically connected to each other, the first processing unit switches off the first wireless communication unit, and the second processing unit switches off the second wireless communication unit; when the wireless earphone is detached from the accommodating recess, the first electrical connector and the second electrical connector are separated from each other, the first processing unit switches on the first wireless communication unit, and the second processing unit switches on the second wireless communication unit, such that the first wireless communication unit and the second wireless communication unit are paired with each other;
wherein the device body further comprises a first microphone, the first processing unit is electrically connected to the first microphone, the wireless earphone further comprises a second microphone and a speaker, the second processing unit is electrically connected to the second microphone and the speaker; when the first electrical connector and the second electrical connector are electrically connected to each other, the first processing unit enables the first microphone and the second processing unit disables the second microphone and enables the speaker; when the first electrical connector and the second electrical connector are separated from each other, the first processing unit disables the first microphone and the second processing unit enables the second microphone and enables the speaker.

2. The mobile device of claim 1, wherein a front of the device body has a through hole, the through hole communicates with the accommodating recess, the wireless earphone has a receiver portion; when the wireless earphone is accommodated in the accommodating recess, the receiver portion is accommodated in the through hole.

3. The mobile device of claim 1, wherein the device body further comprises a first magnetic member disposed in the accommodating recess, the wireless earphone further comprises a second magnetic member; when the wireless earphone is accommodated in the accommodating recess, the first magnetic member and the second magnetic member attract each other magnetically.

4. The mobile device of claim 1, wherein the device body further comprises a first power supply unit electrically connected to the first electrical connector, the wireless earphone further comprises a second power supply unit electrically connected to the second electrical connector; when the first electrical connector and the second electrical connector are electrically connected to each other, the first power supply unit charges the second power supply unit through the first electrical connector and the second electrical connector.

5. A wireless earphone configured to be detachably accommodated in an accommodating recess of a back of a device body, the device body comprising a first processing unit, a first wireless communication unit and a first electrical connector, the first processing unit being electrically connected to the first wireless communication unit and the first electrical connector, the first electrical connector being disposed in the accommodating recess, the wireless earphone comprising:
   a second processing unit;
   a second wireless communication unit, the second processing unit being electrically connected to the second wireless communication unit; and
   a second electrical connector, the second processing unit being electrically connected to the second electrical connector;
   wherein when the wireless earphone is accommodated in the accommodating recess, the first electrical connector and the second electrical connector are electrically connected to each other, the first processing unit switches off the first wireless communication unit, and the second processing unit switches off the second wireless communication unit; when the wireless earphone is detached from the accommodating recess, the first electrical connector and the second electrical connector are separated from each other, the first processing unit switches on the first wireless communication unit, and the second processing unit switches on the second wireless communication unit, such that the first wireless communication unit and the second wireless communication unit are paired with each other;
   wherein the device body further comprises a first microphone, the first processing unit is electrically connected to the first microphone, the wireless earphone further comprises a second microphone and a speaker, the second processing unit is electrically connected to the second microphone and the speaker; when the first electrical connector and the second electrical connector are electrically connected to each other, the first processing unit enables the first microphone and the second processing unit disables the second microphone and enables the speaker; when the first electrical connector and the second electrical connector are separated from each other, the first processing unit disables the first microphone and the second processing unit enables the second microphone and enables the speaker.

6. The wireless earphone of claim 5, wherein a front of the device body has a through hole, the through hole communicates with the accommodating recess, the wireless earphone has a receiver portion; when the wireless earphone is accommodated in the accommodating recess, the receiver portion is accommodated in the through hole.

7. The wireless earphone of claim 5, wherein the device body further comprises a first magnetic member disposed in the accommodating recess, the wireless earphone further comprises a second magnetic member; when the wireless earphone is accommodated in the accommodating recess, the first magnetic member and the second magnetic member attract each other magnetically.

8. The wireless earphone of claim 5, wherein the device body further comprises a first power supply unit electrically connected to the first electrical connector, the wireless earphone further comprises a second power supply unit electrically connected to the second electrical connector; when the first electrical connector and the second electrical connector are electrically connected to each other, the first power supply unit charges the second power supply unit through the first electrical connector and the second electrical connector.

* * * * *